United States Patent [19]

Van Hout et al.

[11] Patent Number: 5,738,324
[45] Date of Patent: Apr. 14, 1998

[54] MOUNTING ASSEMBLY

[75] Inventors: James E. Van Hout, Auburn Hills; Lee M. Dziekan, Metamora; Paul Walker, Rochester Hills, all of Mich.

[73] Assignee: Chrysler Corporation, Auburn Hills, Mich.

[21] Appl. No.: 554,022

[22] Filed: Nov. 6, 1995

[51] Int. Cl.⁶ ............................................. A47H 1/10
[52] U.S. Cl. ................................. 248/317; 248/309.1
[58] Field of Search ............................. 248/317, 309.1, 248/551, 201, 205.1, 917

[56] References Cited

U.S. PATENT DOCUMENTS

| | | | |
|---|---|---|---|
| 3,555,551 | 1/1971 | Gronlund | 343/715 |
| 3,658,219 | 4/1972 | Van Ordt | 224/42.42 |
| 4,082,387 | 4/1978 | Davis | 312/242 |
| 4,109,252 | 8/1978 | Hacker et al. | 343/715 |
| 4,368,866 | 1/1983 | Urban | 248/286 |
| 4,527,764 | 7/1985 | Krause | 248/309.1 |
| 4,651,963 | 3/1987 | Busse et al. | 248/309.1 |
| 5,132,666 | 7/1992 | Fahs | 340/468 |
| 5,326,133 | 7/1994 | Breed et al. | 280/735 |

*Primary Examiner*—Leslie A. Braun
*Assistant Examiner*—Willie Berry, Jr.

[57] ABSTRACT

A mounting assembly includes a first plate which is welded to the underside of a trough which channels fluid around the trunk opening of an automotive vehicle. The first plate includes two pockets and two extensions. A second plate, having two blades, is securable to the first plate by inserting the blades into the pockets and screwing the second plate to the first plate at the extensions thereof. Because the extensions extend out beyond the trough, the second plate is secured to the trough without altering the trough. An electrical unit depends from the second plate using two L-shaped brackets which lock to the second plate. The first plate takes up little space when the electrical unit and the second plate are removed therefrom.

20 Claims, 2 Drawing Sheets

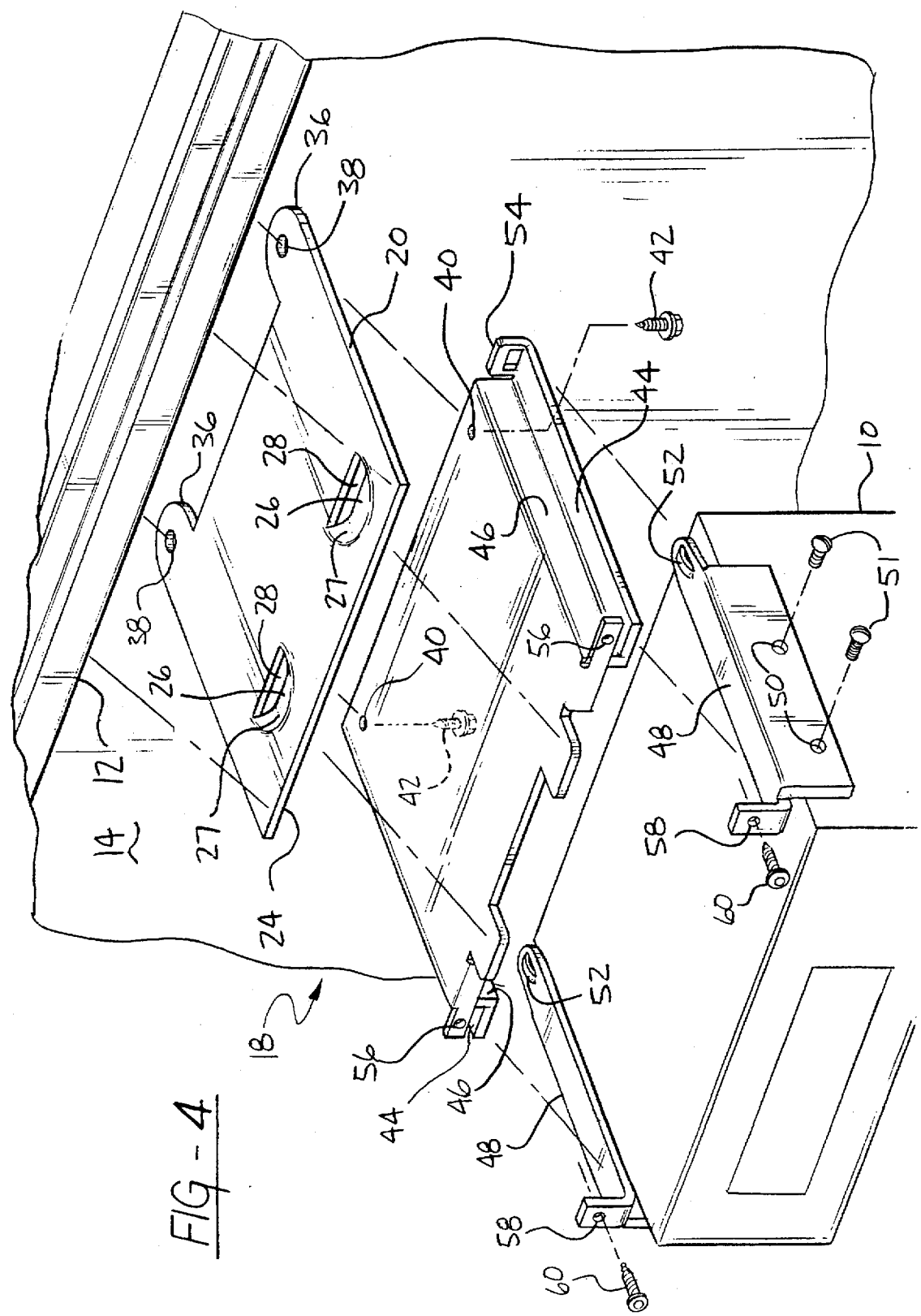

MOUNTING ASSEMBLY

BACKGROUND OF THE INVENTION

1. Field of the Invention

The invention relates to a mounting assembly. More particularly, the invention relates to a mounting assembly for mounting fluid-sensitive components under a fluid-carrying trough.

2. Description of Related Art

The downsizing of the automobile, in combination with the increased amount of electronic controls has led to movement of some of the electronics to remote areas, i.e., areas away from the instrument panel. One such piece of electronics is the compact disc changer which houses a plurality of compact discs. The compact disc changer is a large piece of componentry and, by its nature, has minimal interaction with the operator thereof. More specifically, because the compact disc changer houses between three (3) to ten (10) compact discs, the operator need not access the compact disc changer on a regular basis. Therefore, the compact disc changer is typically found in the trunk of an automotive vehicle.

Placement in the trunk alleviates the space required in the passenger compartment of the automotive vehicle. This placement in the trunk, however, does not come without disadvantages. First, placement of the compact disc changer in the trunk may inhibit the ability to pack long object therein. Second, depending on the placement of the compact disc changer, the operator thereof may have to take additional steps to avoid getting dirty when leaning over into the trunk to change the compact discs in the compact disc changer.

Attempts have been made to suspend the compact disc changer from the edge of the trunk opening. The edge includes a trough which directs water and other fluids which enters the opening of the trunk down toward the bumper of the automotive vehicle. In the past, items have been secured to the trough by drilling holes in the trough in subsequently sealing those holes. U.S. Pat. No. 4,109,252, issued to Hacker et al. on Aug. 22, 1978, discloses such an item. An antenna is supported by a bracket wherein a permanent bracket is secured to the trough of the trunk by a bolt which extends through a hole in the trough. A bolt in the bottom of the trough of the trunk opening is aesthetically unpleasing and potentially damaging, especially when the component depending from the trough is electronically operated. If the seal were to harden or age, any fluid leaking from the trough would land directly on the electronic component, possibly damaging the circuitry and any power supply. In addition, the fluid would aid in the oxidation of the bare metal exposed to the fluid during the drilling of the holes which would increase warranty costs.

SUMMARY OF THE INVENTION

Accordingly, a mounting assembly for mounting a unit to a structure is disclosed. The mounting assembly includes a first plate having a first surface secured to the structure and a second surface opposite the first surface. A second plate is removably securable to the first plate. The first plate includes a pocket having a cut through the first plate such that the pocket receives a portion of the second plate therein to secure the second plate adjacent the first plate.

One advantage associated with the invention is the ability to secure a unit to a structure without compromising the structure, i.e., placing a hole in the structure. Another advantage associated with the invention is the ability to secure a unit to a structure in a desirable location. Yet another advantage of the invention is providing a first plate which may secure a unit thereto and is ergonomically superior when not being used, i.e., the pockets are closed on the side of the trunk opening so that the hands of someone loading the trunk will not be cut in an attempt to fill it to capacity.

BRIEF DESCRIPTION OF THE DRAWINGS

Other advantages of the present invention will be readily appreciated as the same becomes better understood by reference to the following detailed description when considered in connection with the accompanying drawings, wherein:

FIG. 4 is an exploded view of one embodiment of the invention holding a unit and secured to a structure, partially cut away.

DETAILED DESCRIPTION OF THE PREFERRED EMBODIMENT(S)

Figure 1:
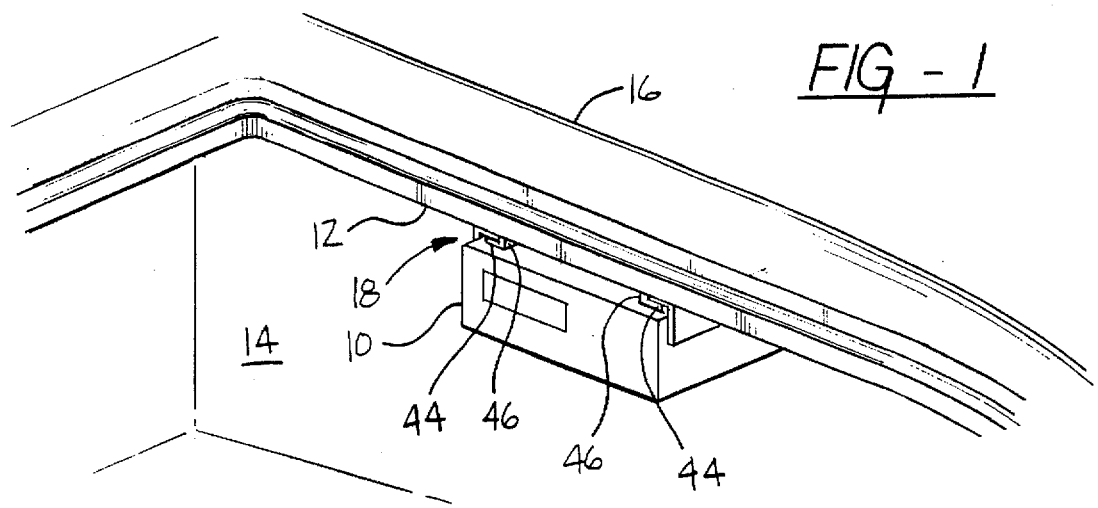
FIG. 1 is a perspective view of a unit mounted to an automotive vehicle, shown partially cut away.

Referring to FIG. 1, a unit 10 is secured to a structure 12. In this embodiment, the unit 10 is a compact disc changer and the structure 12 is a trough surrounding a trunk 14 of an automotive vehicle 16. It may be appreciated by those skilled in the art that the unit 10 may be something other than a compact disc changer and the structure 12 may be something other than a trough surrounding a automotive vehicular trunk 14.

Figure 2:
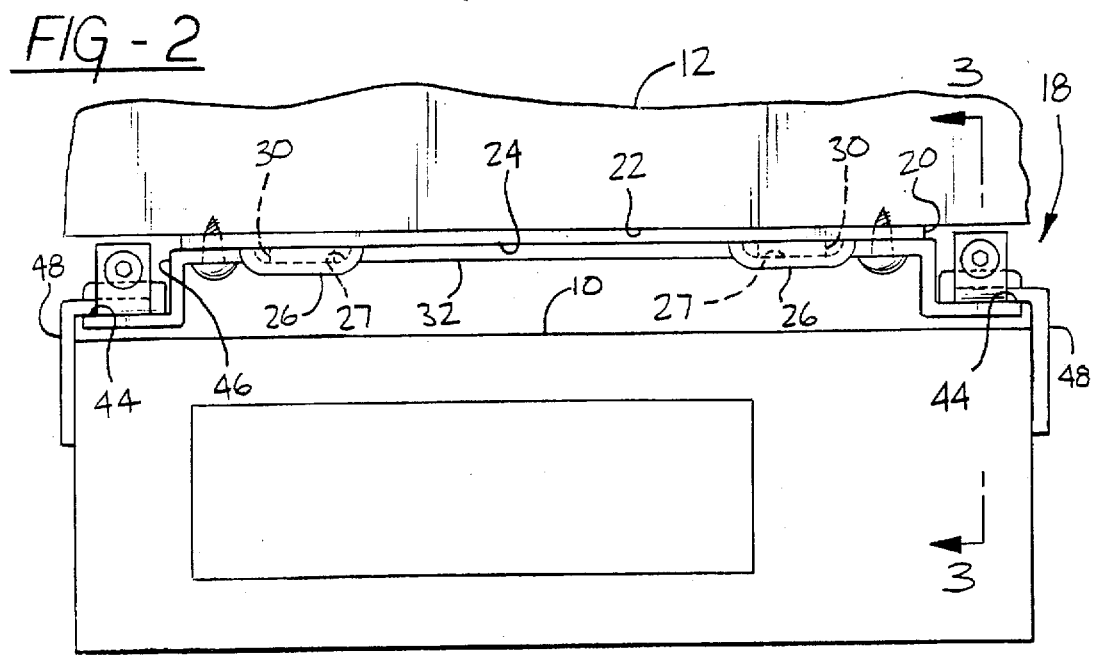
FIG. 2 is a front view of one embodiment of the invention holding a unit and secured to a structure, partially cut away.

Turning to FIG. 2, the trough 12 is shown partially cut away. The compact disc changer 10 is secured to the trough 12 by a mounting assembly, generally indicated at 18. The mounting assembly includes a first plate 20 having a first surface 22 and a second surface 24. The second surface 24 is opposite the first surface 22. In this embodiment, the first plate 20 is substantially planar.

Figure 3:
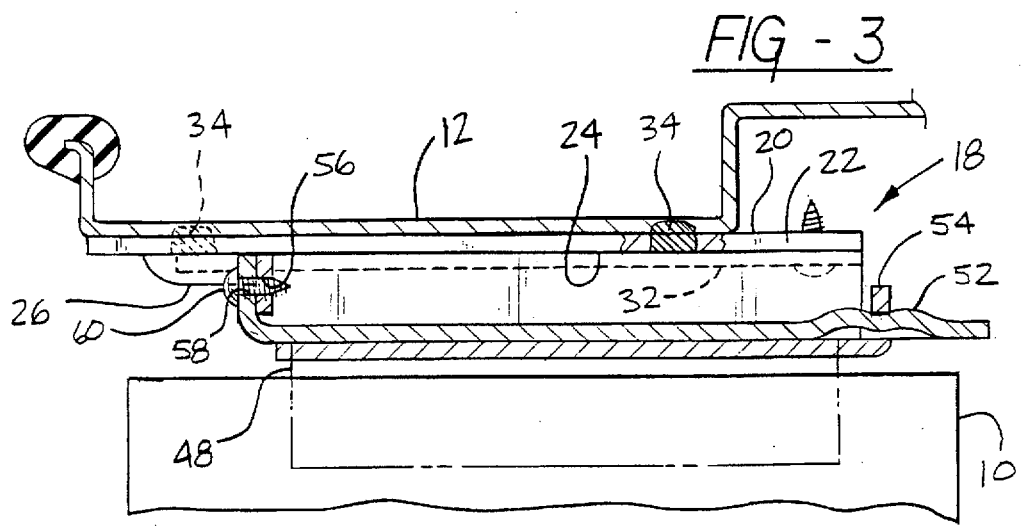
FIG. 3 is a cross-sectional view taken along lines 3—3 of FIG. 2.

As may be best seen in FIGS. 3 and 4, the first plate 20 includes a pocket 26 having a cut 28 extending through the first plate 20. In this embodiment, the first plate 20 includes two pockets 26. Portions 27 of the first surface 22 form the pockets 26. The pockets 26 allow the second plate 32 to depend from and are supported by the first plate 20 while maintaining the integrity of the floor of the trough 12. The trough 12 is not required to be cut, drilled, or otherwise compromised. This removes any need for seals.

The pockets 26 receive a portion 30 of a second plate 32 therein. The portions 30 of the second plate 32 are blades which extend through the cuts 28 of the pockets 26 and are supported on the pockets 26 defined by the first surface 22.

The first plate 20 is secured to the trough 12 by welding at weld spots 34. Therefore, the first plate 20 is fixedly secured to the trough 12. The pockets 26 are used, as opposed to open-ended slots, in the forward portion of the first plate 20 so that people loading the trunk 14 will not cut their hands when the loading is near the first plate 20 and the unit 10 is not present. More specifically, the first plate 20 is designed so that, if a unit 10 such as a compact disc changer is not purchased by the owner of the automotive vehicle 16, the first plate 20 will be as unobtrusive as possible.

The first plate 20 further includes an extension 36 which extends out past the trough 12 at the end of the first plate 20 opposite that of the end where the pockets 26 are located. In the preferred embodiment, the first plate 20 includes two extensions 36. The extensions 36 include a first aperture 38 which is aligned with a second aperture 40 located in the second plate 32. Both of the first aperture 38 and the second aperture 40 receive a screw 42 therein to secure the back portion of the second plate 32 to the first plate 20. It may be apparent to those skilled in the art that the screw 42 may be replaced with other removably securable elements such as nuts and bolts, clips and the like. Also, as shown in the Figures, more than one aperture 38, 40 and screw 42 may be used.

The second plate 32 includes a unit support surface 44. In one embodiment, the second plate 32 includes two unit support surfaces 44. The unit support surfaces 44 are connected to the second plate 32 via depending surfaces or flanges 46 extending perpendicularly down from the second plate 32. The unit support surface 44 engage two L-brackets 48 which are fixedly secured to the compact disc changer 10 via holes 50 and screws 51.

Once the blades 30 are inserted into the pockets 26 and supported by the support portion 27, and the screws 42 have secured the back portion of the second plate 32 by screwing the screws 42 through the first apertures 38 and second apertures 40, the compact disc changer 10 is slid into supporting relationship with the second plate 32. The L-brackets 48 slide over the unit support surfaces 44 of the second plate 32. Each of the L-brackets 48 include a locking surface 52 which is inserted into a locking structure 54 located at the end of each of the unit support surfaces 44. A third set of apertures 56, secured to the second plate 32, align with a fourth set of apertures 58, secured with the L-brackets 48. When the compact disc changer 10 is mounted onto the second plate 32, the third 56 and fourth 58 sets of apertures are in abutting relationship. A third set of screws 60 extend through the third 56 and fourth 58 set of apertures to further secure the compact disc changer 10 to the second plate 32. In one embodiment, the third set of screws 60 are anti-theft screws to prevent the theft of the compact disc changer 10.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that within the scope of the appended claims the invention may be practiced otherwise than as specifically described.

What is claimed is:

1. A mounting assembly for mounting a unit to a structure having a bottom surface, said mounting assembly comprising:

a first plate having a first surface adapted to be secured to the bottom surface of the structure and a second surface opposite said first surface;

a second plate removably securable to said first plate; and said first plate including an open sided pocket struck out from said first plate and having one opening formed by a cut through said first plate whereby said pocket receives a blade portion of said second plate therein securing said second plate adjacent said first plate to maintain the integrity of the bottom surface of the structure.

2. A mounting assembly as set forth in claim 1 wherein said pocket includes a supporting portion such that said portion of said second plate is supported thereby.

3. A mounting assembly as set forth in claim 2 wherein said supporting portion includes said first surface.

4. A mounting assembly as set forth in claim 2 wherein said second plate includes a unit support surface.

5. A mounting assembly as set forth in claim 4 wherein said unit support surface includes a locking structure to lock the unit to said second plate.

6. A mounting assembly as set forth in claim 5 including a bracket fixedly secured to the unit.

7. A mounting assembly as set forth in claim 6 wherein said bracket includes a depending surface fixedly secured to said unit support surface such that said bracket and the unit depend therefrom.

8. A mounting assembly as set forth in claim 1 wherein said first plate includes an extension extending out past the structure.

9. A mounting assembly as set forth in claim 8 wherein said extension includes a first aperture.

10. A mounting assembly as set forth in claim 9 wherein said second plate includes a second aperture alignable with said first aperture to secure said second plate to said first plate.

11. A mounting assembly for mounting a unit to a fluid carrying structure having a predetermined width and a bottom surface, said assembly comprising:

a first plate having a first surface adapted to be secured to the bottom surface of the fluid carrying structure and a second surface opposite said first surface;

a second plate removably securable to said first plate; and said first plate, including an open sided pocket struck out from said first plate and having an opening formed by a cut through said first plate whereby said pocket receives a blade portion of said second plate therethrough securing said second plate adjacent said first plate and maintaining the integrity of the bottom surface of the fluid carrying structure.

12. A mounting assembly as set forth in claim 11 wherein said pocket includes a supporting portion such that said portion of said second plate is supported thereby.

13. A mounting assembly as set forth in claim 12 wherein said supporting portion includes said first surface.

14. A mounting assembly as set forth in claim 12 wherein said second plate includes a unit support surface.

15. A mounting assembly as set forth in claim 14 wherein said unit support surface includes a locking structure to lock the unit to said second plate.

16. A mounting assembly as set forth in claim 15 including a bracket fixedly secured to the unit.

17. A mounting assembly as set forth in claim 11 wherein said first plate includes an extension extending out past the predetermined width of the fluid carrying structure.

18. A mounting assembly as set forth in claim 17 wherein said extension includes a first aperture.

19. A mounting assembly as set forth in claim 18 wherein said second plate includes a second aperture alignable with said first aperture to secure said second plate to said first plate.

20. An automotive vehicle comprising:

a structural body including a trunk defining a periphery and a trunk lid;

a fluid trough extending along at least a portion of said periphery of said trunk, said fluid trough having two side walls and a trough floor extending therebetween, said trough floor having a predetermined width;

a first plate for mounting an electronic unit to said trough floor, said first plate fixedly secured to said trough floor;

a second plate removably securable to said first plate; and said first plate including a pocket having a cut through said first plate such that said pocket receives a portion of said second plate therethrough to secure said second plate adjacent said first plate and for maintaining the integrity of said trough floor.

* * * * *